United States Patent [19]

Sayegh

[11] 4,072,844

[45] Feb. 7, 1978

[54] APPARATUS FOR ELECTRON BEAM MACHINING IN VACUUM

[75] Inventor: Georges Sayegh, Montrouge, France

[73] Assignee: Sciaky Bros., Inc., Chicago, Ill.

[21] Appl. No.: 700,090

[22] Filed: June 28, 1976

[30] Foreign Application Priority Data

Feb. 7, 1976 France ............................ 75 20838

[51] Int. Cl.² ............................................. B23K 15/00
[52] U.S. Cl. .............................. 219/121 EB; 52/396; 339/94 R; 219/121 EM; 404/69
[58] Field of Search ................ 219/121 EM, 121 EB; 404/64, 69, 47, 68; 52/396, 403; 49/56, 504, 489; 339/94; 277/66, 30, 175, 174, 190, 191, 205

[56] References Cited

U.S. PATENT DOCUMENTS

| 1,790,075 | 1/1931 | Rogers | 52/396 |
| 3,136,883 | 6/1964 | Radtke | 219/121 EB X |
| 3,264,004 | 8/1966 | Sciaky | 219/121 EB X |
| 3,719,791 | 3/1973 | Peyrot | 219/121 EB X |

*Primary Examiner*—J. V. Truhe
*Assistant Examiner*—Mark Paschall
*Attorney, Agent, or Firm*—Julius L. Solomon

[57] ABSTRACT

An apparatus for the working of materials in a vacuum by means of an electron beam. A vacuum machining facility incorporating a first chamber which includes a longitudinal gap which determines a vacuum tight area around the machining line of the parts to be machined, a flexible sealing strip to plug the gap and a second leakproof chamber which houses an electron gun. The second chamber abutting the first chamber, includes an orifice located close to the gap through which the electron beam passes. The second chamber is movable on the first chamber along the gap. An apparatus is included which moves the plugging strip out of and to the side of the gap in the proximity of the orifice, the plugging strip being fully housed inside the gap except in the region close to the orifice.

7 Claims, 7 Drawing Figures

APPARATUS FOR ELECTRON BEAM MACHINING IN VACUUM

This invention concerns an apparatus for the working of materials by means of an electron beam in a vacuum.

The present invention deals with a facility composed of a first chamber of great dimensions and a second chamber of reduced dimensions mobile with respect to the first one and connected to it; the whole assembly is vacuum tight and a single vacuum system connected to any of both chambers can insure simultaneous pumpdown of both and maintain inside a given degree of vacuum regardless of their relative positions within the manufacturing dimensional limits and of their relative motions. According to the invention, the position of the connecting orifice allows free passage of an electron beam produced by a mobile electron gun connected to the second chamber, for the machining in a vacuum of a large stationary workpiece placed in or against the first chamber. This beam can be equally employed for machining, treatment or welding under vacuum of any type of part.

Such an arrangement in which the two chambers are connected together in a given plane, the first chamber incorporating a perfectly machined plane surface drilled with an oblong hole surrounded by one or several O-rings and the second chamber, movable with respect to the first one, also including a perfectly machined surface in contact against the first one, is well known. The assembly must be operated so that the orifice of the movable chamber faces the oblong hole of the other chamber and never moves beyond the area surrounded by the O-ring. This arrangement is not suitable for great work lengths and is limited to one or two meters.

Another arrangement, in which an oblong hole in a first chamber is covered by two plates or strips made of metal or other material placed against this orifice and coiled or uncoiled as a second chamber connected to the first one moves, is also well known; the assembly acts in combination with lip seals so as to maintain the desired degree of sealing. An alternative version of this arrangement, in which only one strip is used, this strip being moved away from the covering position in conjunction with the position of the second chamber, is also known.

These well-known arrangements have certain drawbacks. Indeed, the lip seals do not run on a plane surface for the strip represents a certain extra thickness with respect to the wall of the first chamber, thereby permitting a leak in the triangle formed by the edge of the strip, the lip seals and said wall. To minimize this drawback, the manufacturers of such systems have been using extremely thin, hence fragile strips which made the application of this arrangement critical for great useful lengths.

The present invention obviates these drawbacks and makes it possible, in particular, to obtain leakproof machining facilities of significant useful length, i.e., 15 m for instance, thereby displaying the advantages of facilities in which the stationary chamber is composed of several elements for working very large workpieces in one single operation.

The facility described in the present invention therefore incorporates a large first chamber including a longitudinal gap which determines a leakproof area around the machining line of the parts to be machined, a flexible strip to plug this gap, a second leakproof chamber which houses an electron gun, this second chamber including an orifice located close to the gap, sealing systems located around the orifice between both chambers, a drive unit to move it on the first chamber and along the gap, a system designed to move the plugging strip away from the gap close to the orifice to allow the electron beam to flow; this facility is featured by the fact that the strip is fully housed inside the gap, its upper face being level with the outer face of the first chamber.

According to another feature of the invention, the gap of the first chamber includes, if we observe its cross-section, two areas as follows: the area placed outside with respect to the chamber, which is wider than the inner area, the strip having, in cross-section, a shape and dimensions corresponding to those of the external area of the gap.

According to another feature of the invention, the strip has a trapezoidal section.

According to another feature of the invention, the strip has a core made of non-expandable material.

The invention is shown as a non-exhaustive example on the enclosed drawings in which.

Figure 1:
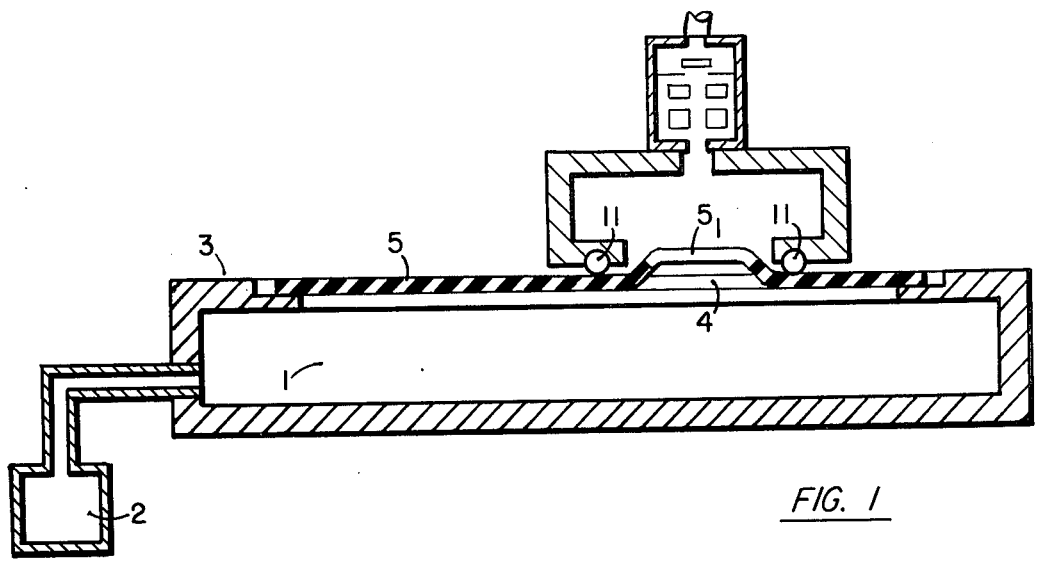
FIG. 1 is a schematic side view of a facility conforming to the invention.
Figure 2:
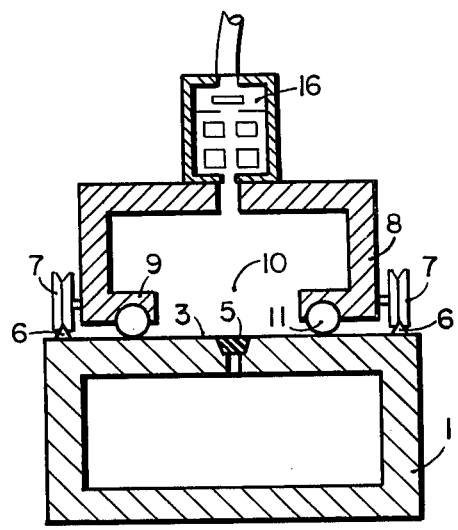
FIG. 2 is section A—A of FIG. 1.

The facility shown on FIGS. 1 and 2 enclosed is composed of a stationary chamber 1 connected to a vacuum source 2 and includes an upper surface 3 — plane or cylindrically incurved — in which a gap 4 has been opened to house seal 5. On this upper surface 3 are installed two rails 6 on which run the guiding and carrying rollers 7 of mobile chamber 8. This mobile chamber 8 houses the machining electron gun whereas chamber 1 houses the parts to be machined or at least surrounds the machining area of these parts to be machined.

Chamber 8 includes a lower face 9 drilled with an orifice 10 placed vertically with respect to the gap of chamber 1; this face 9 of chamber 8 also incorporates a seal 11 surrounding this orifice 10 and located between both chambers 1 and 8 so that the vacuum source 2 can maintain the vacuum in both chambers 1 and 8 despite the fact that chamber 8 is mobile with respect to chamber 1.

To enable the beam coming from the gun in chamber 8 to act on the parts to be machined which are located in chamber 1, it is sufficient to remove and slightly offset seal 5 within its area $5_1$ which is inside seal 11 so as to clear gap 4 in the vertical axis of the gun.

This is achieved within the limits of orifice 10 via a set of rollers rotating freely around their axis and mounted on chamber 8, these rollers obliging seal 5 to form a loop $5_1$ offset with respect to gap 4.

Figure 4:
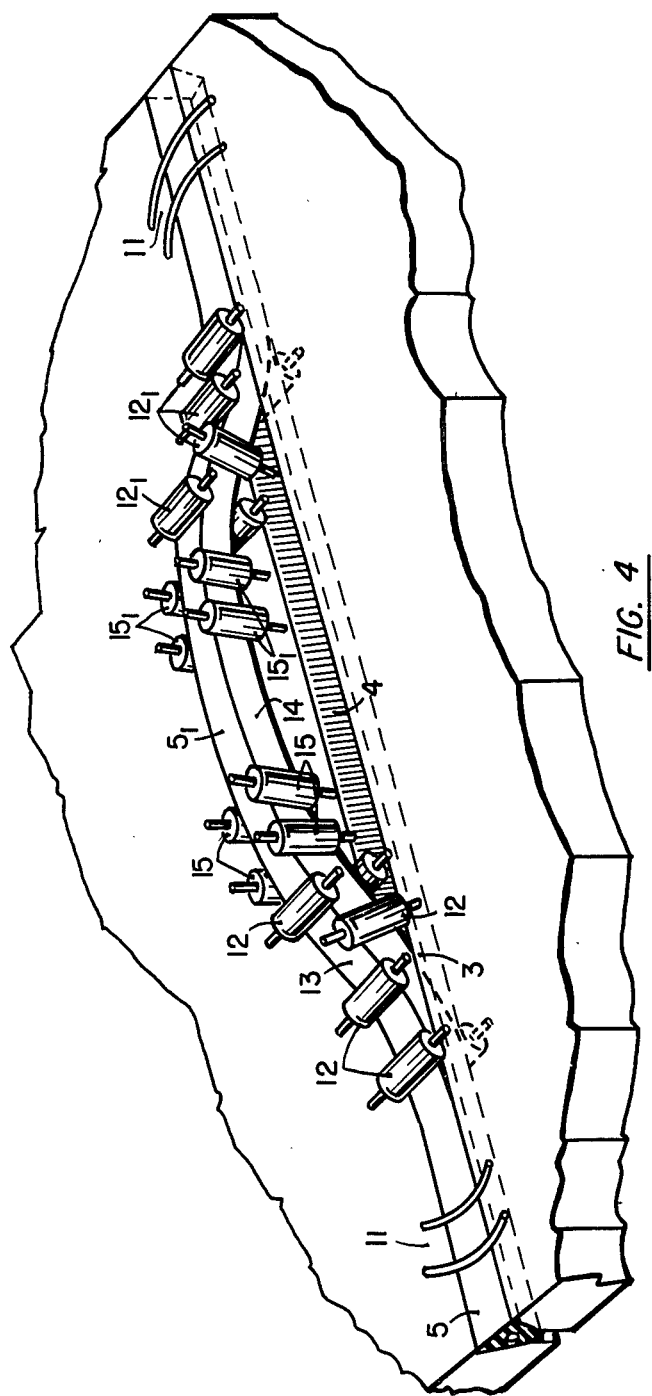
FIG. 4 is a schematic view in perspective showing the means to remove and offset the seal with respect to its gap.

Thus, on FIG. 4, if we consider that chamber 8 moves in the direction of arrow F, seal 5 is first given, via rollers 12, an initial curvature 13 within a plane perpendicular to face 3 of chamber 1 and second, via rollers 15, a curvature 14 within a plane parallel to face 3, both curvatures being obviously combined so that the overall length of loop $5_1$ be rather small and make it possible to achieve an orifice 10 and a chamber 8 of small dimensions.

Replacing of seal 5 in its gap 4 is obtained by an arrangement composed of symmetrical rollers $15_1$ and $12_1$ so that chamber 8 can be moved in both directions.

Figure 3:
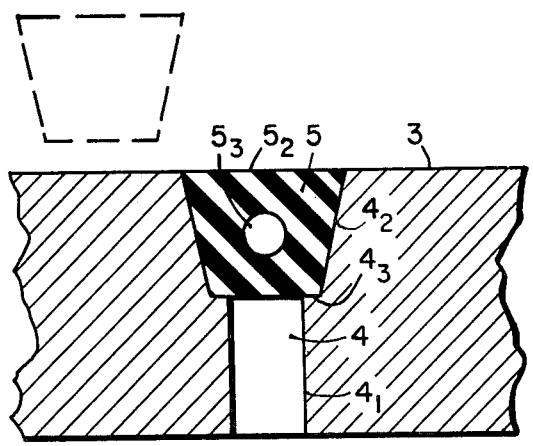
FIG. 3 is a cross-section on a larger scale of the seal in place in the gap.

According to the invention and as shown on enclosed drawings — especially on FIG. 3 — seal 5 is installed within gap 4 so that its upper face $5_2$ is level with upper face 3 of chamber 1, thereby enabling seal 11 to maintain both chambers leakproof with respect to the outside during chamber 8 movement.

Gap 4 which is fitted with this seal is made in two parts $4_1$ and $4_2$ (FIG. 3), part $4_2$ protruding outside chamber 1 and having a section matching the shape of seal 5; both parts $4_1$ and $4_2$ are connected by a shoulder $4_3$ so that the base of seal 5 can rest on it.

According to the invention, this seal 5 is in the shape of an isosceles trapezium fully housed inside part 4, this special shape insuring a perfect seal since the lateral 2 walls of the seal come into close contact against gap part $4_2$ side walls, the sinking of the seal under the action of an inside negative pressure is limited by shoulders $4_3$.

In addition, this special shape of the seal allows it to be easily removed from part $4_2$ of the gap via rollers 12 and permits giving this seal the necessary curvature over a rather short seal length so that mobile chamber 8 dimensions may be as small as possible.

Moreover, this shape of the seal allows easy bending in both direction 13 and 14 via rollers 12 on the one hand and 15 on the other hand with no need for twisting the seal itself as is necessary when it is in the form of a thin strip.

This seal 5 of trapezoidal section, is preferably made of a plastic material having an approximate Shore A hardness of 80° but it includes, according to the invention, core $5_3$ which can be non-elastic depending on the length; this core can be made, for instance, from a metal cable which facilitates the removal and replacement of the seal in gap 4 via rollers 12, 15, $15_1$ and $12_1$.

Figure 5:
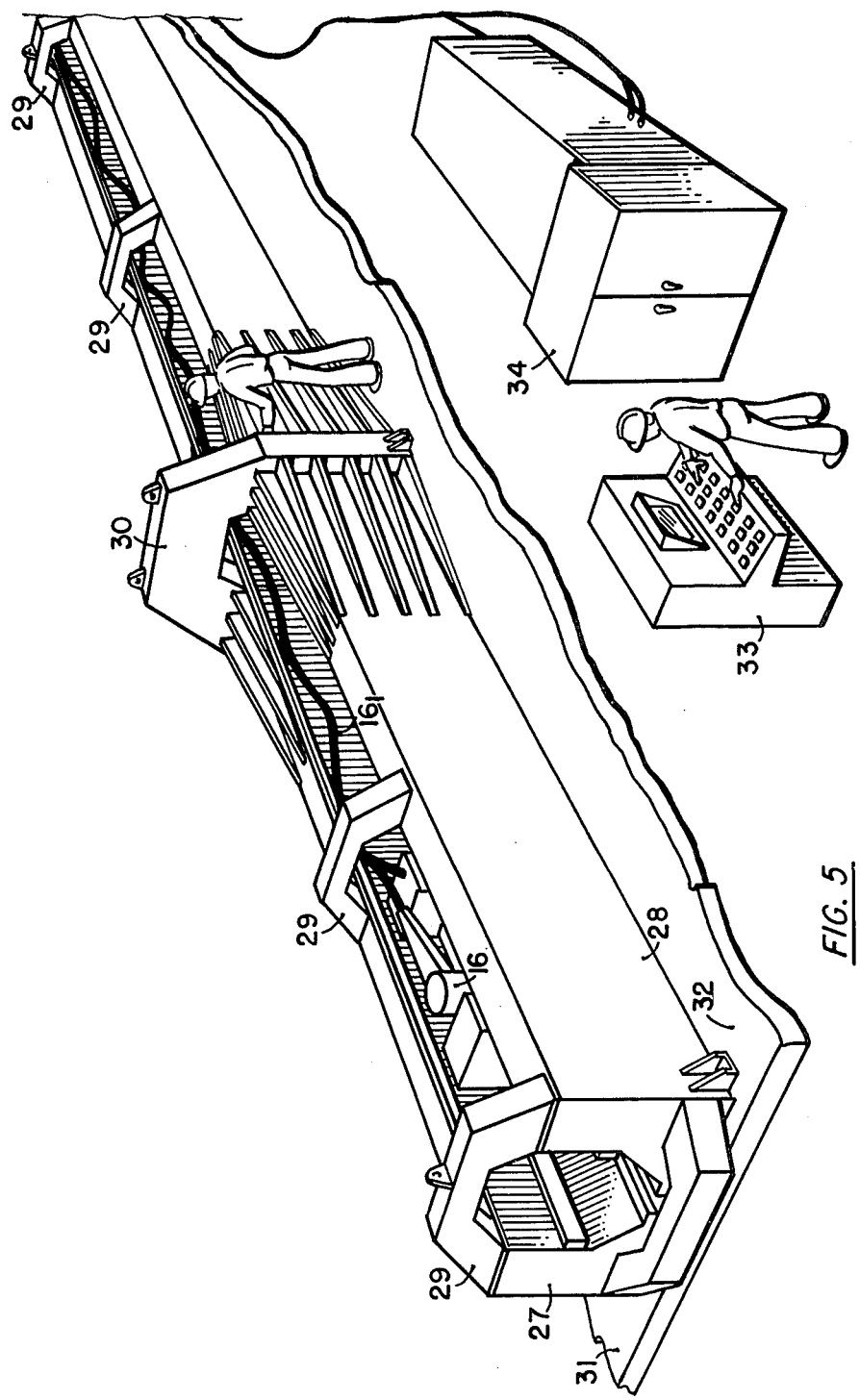
FIG. 5 is a view in perspective of an application of the invention as a welding facility.
Figure 6:
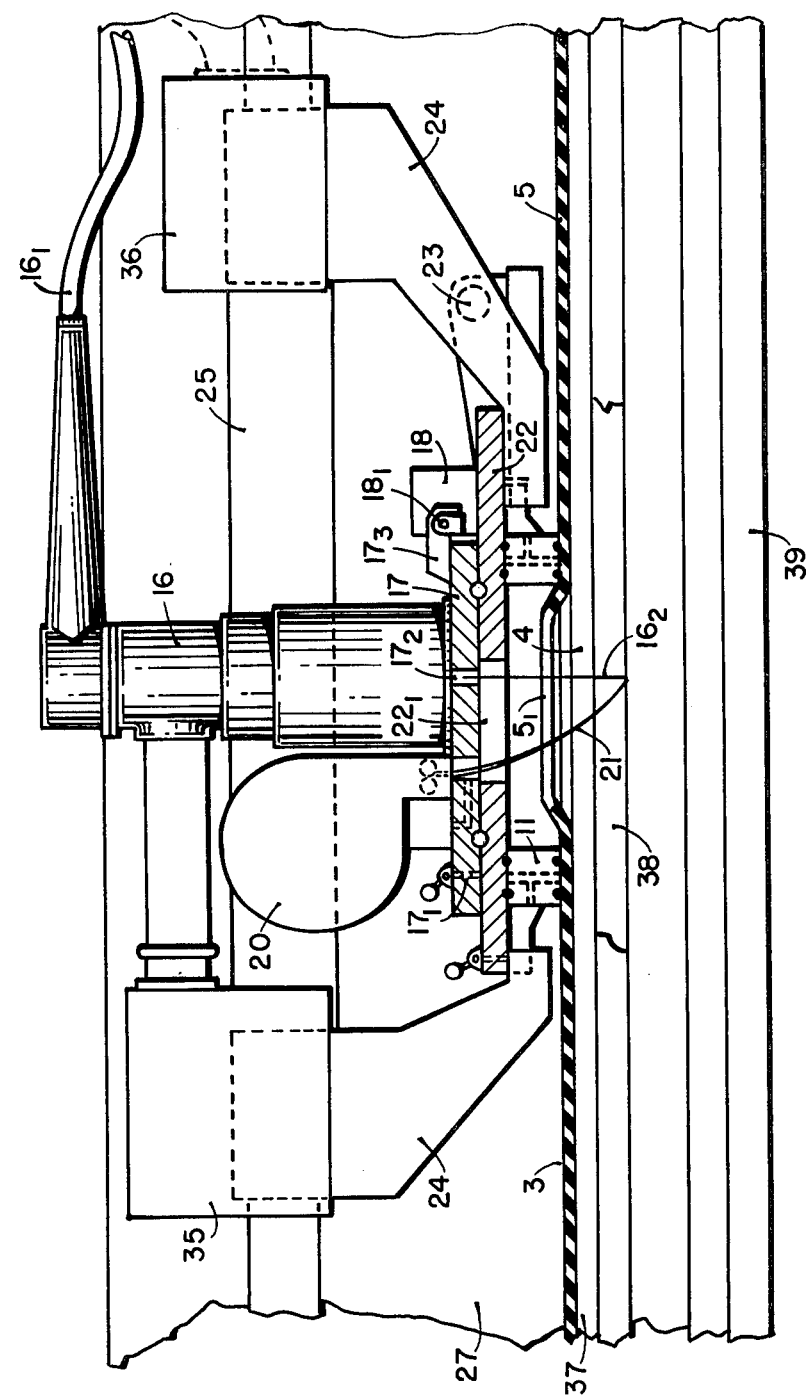
FIG. 6 is a sectional view of FIG. 5 at the seal and in the area of the mobile chamber.
Figure 7:
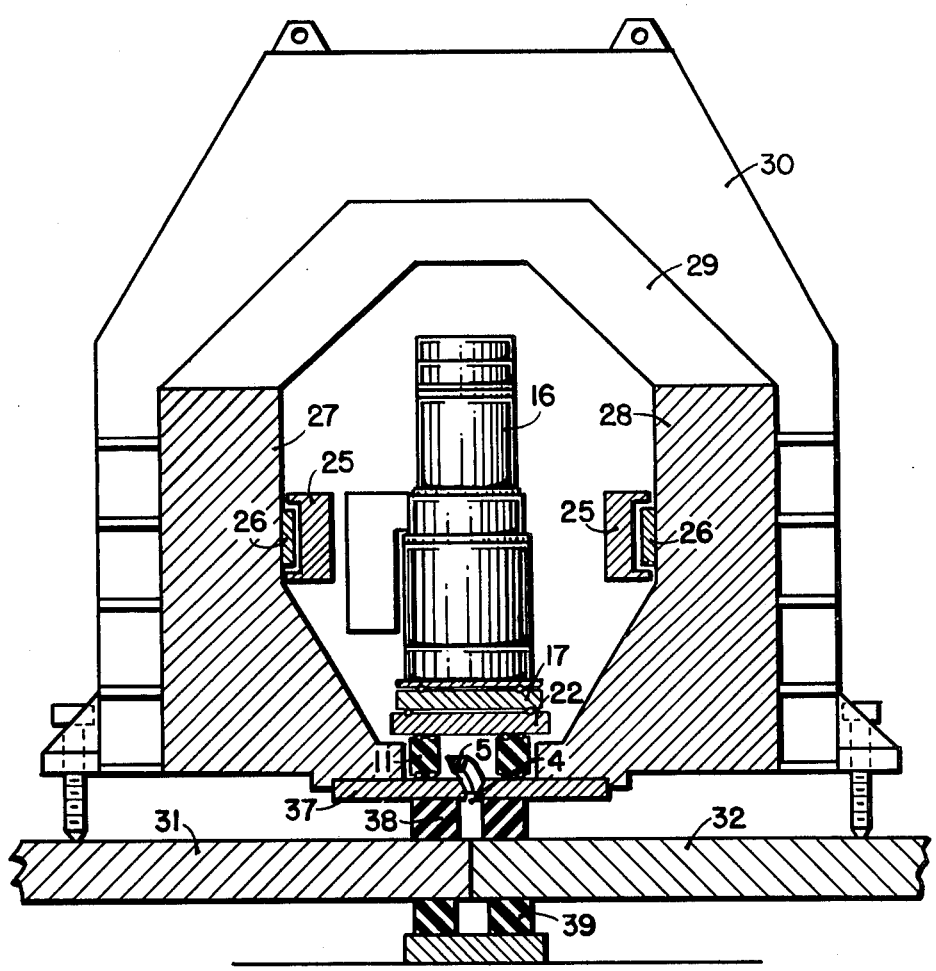
FIG. 7 is section B—B of FIG. 6.

In the arrangement shown in FIGS. 5, 6 and 7, the facility conforming to the invention is a vacuum welding machine and, in this case, the vacuum chamber houses an electron gun 16 supplied by high-voltage cables $16_1$, this gun 16 being fixed to a support plate 17 tilted in a horizontal plane around axis $17_1$. This horizontal pivoting motion is designed to permit a sidewards motion of the welding beam $16_2$ which flows across orifice $17_2$ of plate 17; for this purpose, the motions of this plate 17 are controlled from a drive unit 18 via a rack-and-pinion or worm screw $18_1$ acting on a bracket $17_3$ of this plate 17.

This plate 17 also supports magazine 20 containing the filler wires required for the welding operation and these wires are driven to the welding area via wire guide 21.

Support plate 17 is mounted so as to permit horizontal pivoting on a base plate 22, which in turn is mounted so as to pivot on a horizontal shaft 23 so that gun 16 can be tilted and access to seal 5 can be achieved.

Base plate 22 rests against armatures 24 which form part of a carriage structure equipped with two side slides 25 running on tracks 26 which form guide rails. These tracks 26 are integral with a frame made of two parts 27 and 28 whose relative positions are insured by stirrups 29. As can also be seen on FIG. 5, this very long frame is made in two parts joined together by a central junction part 30. On this FIG. 5, the facility is adapted to the two workpieces 31 and 32 and the presence of a control desk 33 and a high voltge generator 34 can also be noted.

The mobile carriage composed of slides 25 and armatures 24 which support gun 16, plate 17 and base plate 22 is therefore movable within frame 27, 28, 29, 30 and also includes a pumping system 35 as well as a junction box 36.

Beneath base plate 22 of the carriage is fixed annular seal 11 applied against upper face 3 of the stationary chamber, this face being composed in this case of plate 37 and seals 38 fixed to frame 27, 28, 29 and 30. Plate 37 incorporates gap 4 which houses seal 5 and the rollers (not shown) acting on this seal 5 make, within seal 11 applied to face 3, the loop of shifting unit $5_1$, to permit beam $16_2$ to flow from gun 16 to workpieces 31, 32 via orifice $17_2$ of plate 17, opening $22_1$ of base plate 22 and via gap 4.

To insure tightness at the face opposite to the two parts to be welded a complementary sealing system 39 can be provided.

Instead of manufacturing a stationary chamber applied via one of its faces against the workpieces, it is also possible to design a closed stationary chamber; in this case, the parts to be welded being of smaller dimensions — are introduced into this chamber.

The invention is obviously not limited to the above-described example of design, from which other modes and shapes can be developed without exceeding the scope of the invention.

What I claim is:

1. A vacuum machining facility incorporating a first large chamber including a longitudinal gap having a V-shaped cross section which determines a leakproof area around the machining line of the parts to be machined; a flexible strip to plug this gap; a second leakproof chamber which houses a machining tool, this second chamber including an orifice located close to the gap; sealing systems located around the orifice between both chambers, a drive unit to move the said second chamber on the first chamber and along the gap; a system designed to move the plugging strip away from the gap close to the orifice, this arrangement being featured by the fact that the strip is fully housed inside the gap, its upper face being level with the outer face of the first chamber.

2. A factility as in claim 1 in which the said longitudinal gap in said first large chamber is wider in cross section in that portion of the gap facing the outside of the chamber than it is in that portion of the gap which faces the inside of the chamber.

3. A facility in accordance with claim 2 in which a shoulder designed as a strip seating surface is provided between the narrow and wide sections of the gap.

4. A facility conforming to claim 2, featured by the fact that the strip has a trapezoidal section.

5. A facility conforming to claim 2, featured by the fact that the strip has a core made of material having a high elastic limit.

6. A facility conforming to claim 5, featured by the fact that the first large chamber is open on one of its faces, this open face being fitted with a peripheral seal, and applied against the workpieces so as to bound a leakproof area around the workpiece welding line.

7. A facility conforming to claim 1, featured by the fact that the first large chamber including a gap is closed and designed for introduction of workpieces inside of it.

* * * * *